United States Patent
Waldmann

(10) Patent No.: US 6,728,464 B1
(45) Date of Patent: Apr. 27, 2004

(54) DISPLAY OR ILLUMINATION ELEMENT FOR MOTOR VEHICLES

(75) Inventor: Bernd Waldmann, Nürtingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 18 days.

(21) Appl. No.: 09/677,237

(22) Filed: Oct. 2, 2000

(30) Foreign Application Priority Data

Oct. 6, 1999 (DE) .................................... 299 17 623 U

(51) Int. Cl.⁷ ................................................ G02B 6/00

(52) U.S. Cl. ...................................................... 385/147

(58) Field of Search ................................ 385/147, 125, 385/133, 901, 902, 146, 120, 117; 356/383, 73.1, 372; 359/652

(56) References Cited

U.S. PATENT DOCUMENTS

| | | | | |
|---|---|---|---|---|
| 3,801,181 A | * | 4/1974 | Kitano et al. | 359/652 |
| 4,886,354 A | * | 12/1989 | Welch et al. | 356/70 |
| 5,712,899 A | * | 1/1998 | Lanzara et al. | 378/19 |
| 5,757,994 A | * | 5/1998 | Schoenwald et al. | 385/44 |
| 5,841,596 A | * | 11/1998 | Perlo et al. | 359/859 |
| 6,185,356 B1 | * | 2/2001 | Parker et al. | 385/133 |
| 6,252,660 B1 | * | 6/2001 | Frisch et al. | 356/383 |
| 6,259,545 B1 | * | 7/2001 | Whitcomb | 359/199 |

* cited by examiner

Primary Examiner—Jean F. Duverne
(74) Attorney, Agent, or Firm—Gudrun E. Huckett

(57) ABSTRACT

A display or illumination element for motor vehicles has at least one light guide for receiving and guiding light beams emitted by a light source. The at least one light guide has at least one reflection element and at least one surface transparent for the light beams. The at least one reflection element is positioned in a path of the light beams and is configured to reflect the light beams to the at least one transparent surface.

8 Claims, 2 Drawing Sheets

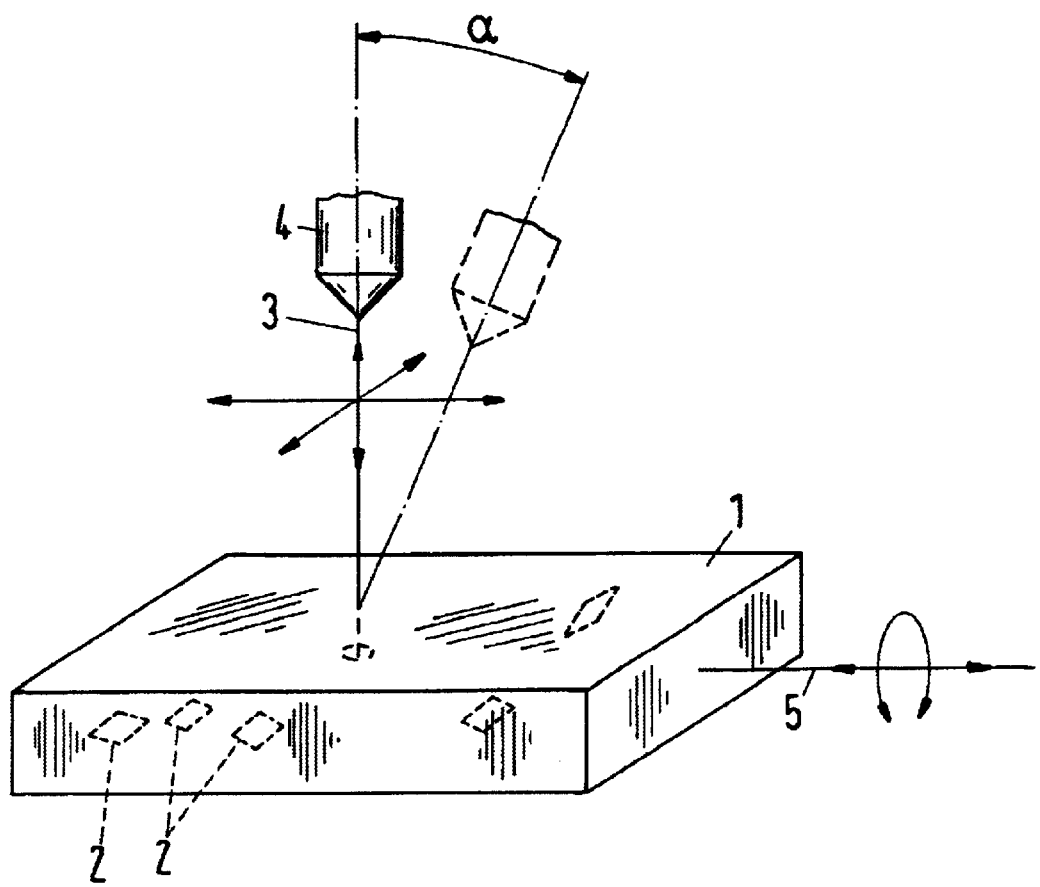

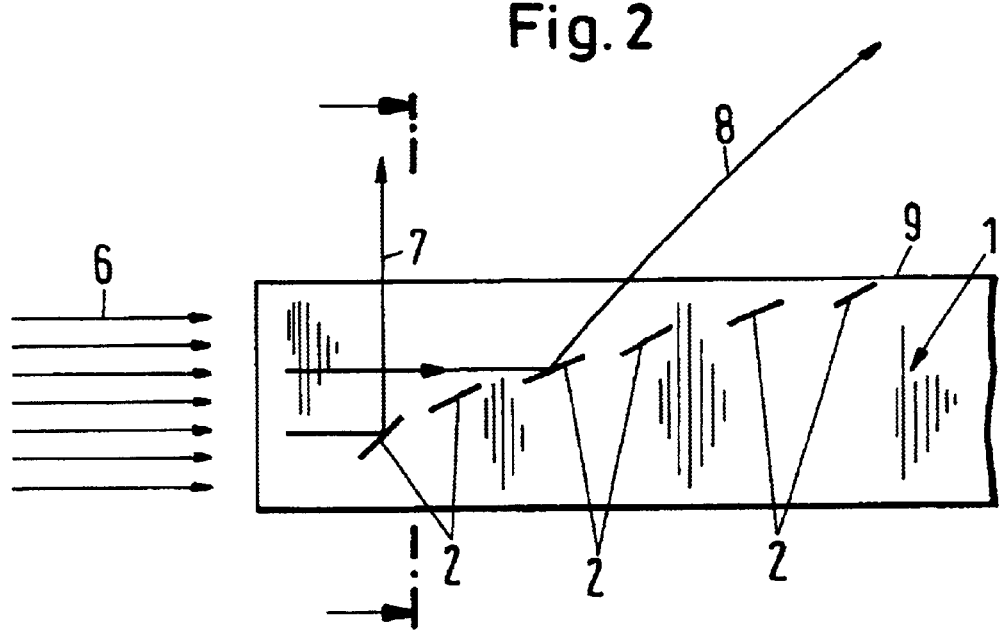
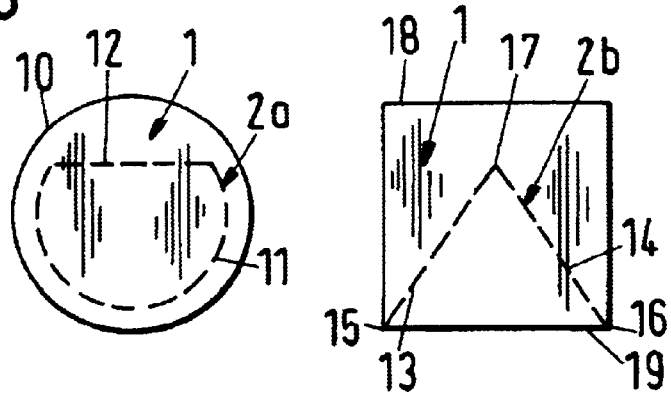 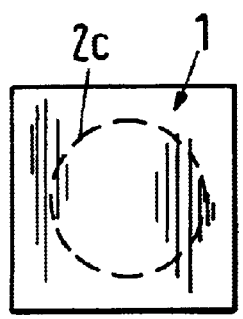
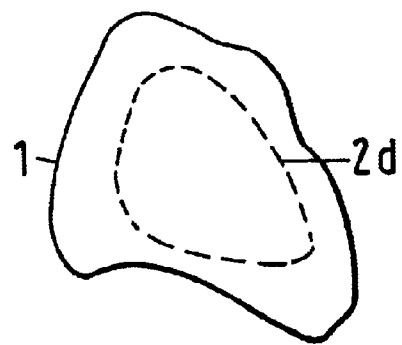

DISPLAY OR ILLUMINATION ELEMENT FOR MOTOR VEHICLES

BACKGROUND OF THE INVENTION

1. Field of the Invention

The invention relates to a display or illumination element for motor vehicles with at least one top side which is transparent for light beams of at least one light source.

2. Description of the Related Art

It is known in the automotive field to provide actuating or operating elements in the interior of a motor vehicle with display or illumination elements which are illuminated at night by a light source arranged behind them so that the individual actuating and operating elements can be easily recognized. These actuating and operating elements are provided with transparent disks, plastic foils or the like through which the light beams emitted by the light source can reach the interior of the motor vehicle.

SUMMARY OF THE INVENTION

It is an object of the present invention to develop the display or illumination device of the aforementioned kind such that in a simple manner the light emitted by the light source can be guided to the exterior side of the display element.

In accordance with the present invention, this is achieved in that the display/illumination element has at least one light guide which is provided with at least one reflection element that is positioned in the propagation path of the light beams and reflects the light beams to the at least one top side of the element.

The display/illumination element according to the invention comprises a light guide which is provided with the reflection element. The light emitted by the light source reaches the reflection element which reflects the light beams to the exterior of the light guide. In this way, the light beams can be reflected in a directed way to the exterior side of the light guide. Within the light guide, the light beams are guided reliably to the reflection element which is positioned in the propagation path of the light beams. With a corresponding configuration and/or arrangement of the reflection elements the reflected light beams can be reflected in a directed way to certain locations of the exterior side of the light guide. The display/illumination element according to the invention is suitable, in particular, for marking edges of the door handles on the vehicle, of the blinds below the sliding sun roof of the vehicle, and the like.

BRIEF DESCRIPTION OF THE DRAWING

In the drawing:

FIG. 1 is a schematic illustration of a display/illumination element according to the invention in which reflective areas are generated by laser treatment;

FIG. 2 is a side view of the display/illumination element according to FIG. 1 in a side view;

FIG. 3 shows the cross-sectional shape of a first embodiment of the display/illumination element according to the invention;

FIG. 4 shows the cross-sectional shape of a second embodiment of the display/illumination element according to the invention;

FIG. 5 shows the cross-sectional shape of a third embodiment of the display/illumination element according to the invention; and FIG. 6 shows the cross-sectional shape of a fourth embodiment of the display/illumination element according to the invention.

DESCRIPTION OF THE PREFERRED EMBODIMENTS

The display and illumination element comprises a light guide 1 which is comprised of a polymer material and is provided within its cross-sectional area with structures 2 which have the task to reflect the light introduced into the light guide 1 to the exterior. For producing these structures 2, the light guide 1 is processed with laser beams 3 which are emitted by a laser device 4. The laser device 4 is focused such that the polymer material of the light guide 1 is locally melted at predefined locations in its interior. As illustrated in FIG. 1, the laser device or its laser unit which emits the laser beam 3 can be moved three-dimensionally relative to the light guide 1 in order to generate the different structures 2 also in a three-dimensional shape within the light guide 1. As indicated by the different movement arrows of FIG. 1, the laser device 4 is moved in three directions, perpendicularly positioned to one another, relative to the light guide 1 and also rotated about an angle a in space. In this way, most different structures 2 can be produced in the light guide 1.

In addition to the described movement possibilities of the laser device 4, the light guide 1 can be rotated about at least one axis 5. It may be advantageous when the light guide 1 can be rotated also about at least one further axis which is positioned, for example, perpendicularly to the axis of rotation 5. With adjusted movements of the laser device 4 and of the light guide 1, the desired structures 2 can be produced easily and precisely in the light guide 1.

It is also possible to configure the laser device 4 so as to be stationary and to then move the light guide 1 relative to the laser device to produce the structures 2.

The structures 2, which are generated by localized melting of the polymer material of the light guide 1, are visible from the exterior when the polymer material is transparent. The structures 2 are reflection elements in which the light introduced from the exterior into the light guide 1 are reflected toward the exterior. As is illustrated schematically with the aid of FIG. 2, the light 6 is introduced at one side of the light guide. When passing through the light guide 1, the light beams (6) impinge onto the structures 2 provided therein where they are reflected to the exterior. FIG. 2 shows as an example two reflected light beams 7 and 8 which are produced by reflection on the structures 2. The structure 2 adjacent to the entry side of the light guide 1 is slanted relative to the beam direction (6) such that a portion of the light beams is reflected at this structure 2 in a direction perpendicularly to the top side 9 of the light guide 1. The reflected beam 7 thus exits perpendicularly from the transparent top surface 9 of the light guide.

A further portion of the light beams 6 reaches further structures 2 which, as an example, are positioned at a different slant relative to the beam direction than the other structures. For example, as illustrated in an exemplary fashion for the reflected beam 8, a portion of the light is reflected such that the reflected light beam 8 reaches the top side 9 of the light guide 1 at an angle different from 90°. The reflected light beam 8 exiting the top sides 9 of the light guide 1 undergoes refraction.

In this way, the structures 2 can be arranged within the light guide 1 such that the impinging light 6 is radiated in different directions to the exterior.

FIG. 3 shows, for example, the possibility to provide a structure 2a in a light guide of a circular cross-section by laser treatment. This structure 2a has a portion 11 extending parallel to the mantle surface 10 of the light guide 1 and over more than 180°. The ends of this portion 11 are connected to one another by a straight portion 12.

FIG. 4 shows the possibility to provide a structure 2b of a triangular shape. The light guide 1 in this case has a square cross-section. The two triangle sides 13, 14 of the structure 2b begin at neighboring corners 15 and 16 of the light guide 1. The tip 17 of the structure 2b has a smaller spacing from the neighboring top side 18 of the light guide than from the opposite top side 19 where the corners 15, 16 are positioned.

FIG. 5 shows again a light guide 1 of a square cross-section in which a circular structure 2c is provided which has a spacing from all lateral surfaces of the light guide 1.

FIG. 6 shows in an exemplary fashion that the structure 2d can have any desired contour. Also, the light guide itself can have any desired cross-sectional shape.

The illustrated (FIGS. 3 to 6) and described structures 2a through 2d are only examples of possible embodiments. The structures, depending on the type of use and/or the desired function, can have different designs. The structures can be provided two-dimensionally but also three-dimensionally within the material of the light guide 1. As illustrated in an exemplary fashion in FIGS. 1 and 2, several structures, independent from one another, can be distributed in the polymer material of the light guide 1. In this situation, the structures 2 can have most different shapes.

With a corresponding distribution of the structures in the light guide 1, the light radiation from the light guide 1 can be influenced in a directed manner.

The described light guides 1 are advantageously used in the automotive field. For example, the light guides can be used on edges of the door handles of motor vehicles so that the position of the door handle can be easily recognized in the dark. Since the structures (2) in the light guide 1 can be arranged as desired, they can be provided in the case of an application for door handles such that the light emitted from the light guide is reflected at the structures such that the emitted light indicates the contour of the door handle. In the same way, such light guides can be used, for example, for the blinds below the sliding sun roof of a motor vehicle in order to indicate its position in the dark. Within the motor vehicle, several operating and actuating elements are provided which can be provided with such light guides so that the operating and actuating elements can be actuated and operated reliably even in the dark; this also serves to improve traffic safety. By means of the structures, which form the reflection elements and which are positioned in the radiation area of the impinging light 6, a large light exit area results on the light guide. The entire light flow 6 can be used for reflection on the structures. Since the structures in the light guide are not only two-dimensionally but also three-dimensionally designed, large degrees of freedom result in regard to the configuration of these structures. Since, moreover, the light guide itself can have most different shapes and configurations, in this way, the light guide can be adapted optimally to the respective application or use.

The structures 2, 2a to 2d can be also configured and arranged such that the light beams are not only exiting from the top side but also, at the same time, from other areas of the exterior of the light guide or, for example, from its underside.

The structures 2, 2a to 2d are arranged advantageously such that the light exits over the entire length of the light guide 1.

While specific embodiments of the invention have been shown and described in detail to illustrate the inventive principles, it will be understood that the invention may be embodied otherwise without departing from such principles.

What is claimed is:

1. A display or illumination element for motor vehicles, said element comprising:

at least one light guide (1) configured to receive and guide light beams (6) of a light source and consisting of a light guide material;

said at least one light guide (1) having at least one reflection element (2, 2a–2d) arranged in an interior of said at least one light guide (1);

said at least one light guide (1) having at least one transparent surface (9) transparent for the light beams (6);

wherein said at least one reflection element (2, 2a–2d) is positioned in a path of the light beams (6) and is configured to reflect the light beams (6) to said at least one transparent surface (9); and wherein said at least one reflection element (2, 2a–2d) consists of the light guide material and Is produced by localized melting of the light guide material and is embedded in the light guide material.

2. The element according to claim 1, wherein said at least one reflection element (2, 2a–2d) is a portion of said at least one light guide (1) which portion has been locally melted by laser beams.

3. The element according to claim 1, wherein several of said reflection elements (2, 2a–2d) are distributed within said at least one light guide (1).

4. The element according to claim 3, wherein said reflection elements (2, 2a–2d) are identical.

5. The element according to claim 3, wherein said reflection elements (2, 2a–2d) are different.

6. The element according to claim 1, wherein said reflection elements (2, 2a–2d) are positioned at different angles to the path of the light beams (6).

7. The element according to claim 1, wherein said at least one reflection element (2, 2a–2d) is a flat structure.

8. The element according to claim 1, wherein said at least one reflection element (2, 2a–2d) is a three-dimensional structure.

* * * * *